July 20, 1965 W. B. KIMBRELL 3,195,927
WEIGHT PIPE
Filed April 4, 1962 4 Sheets-Sheet 1
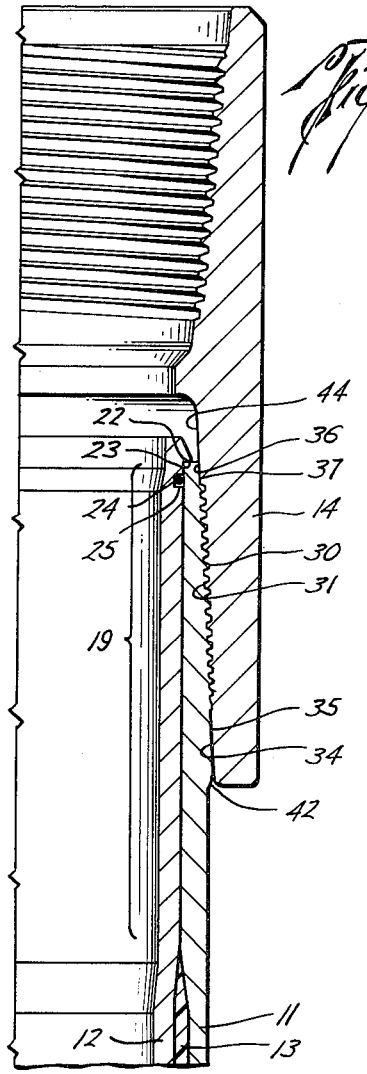
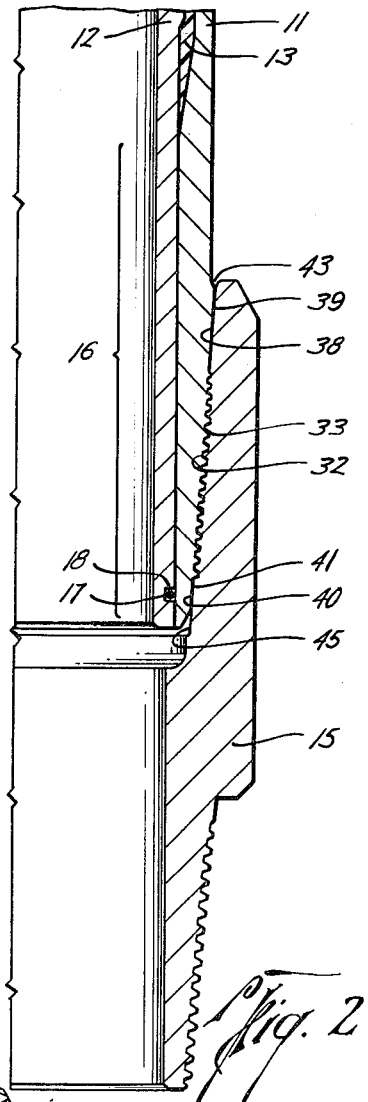
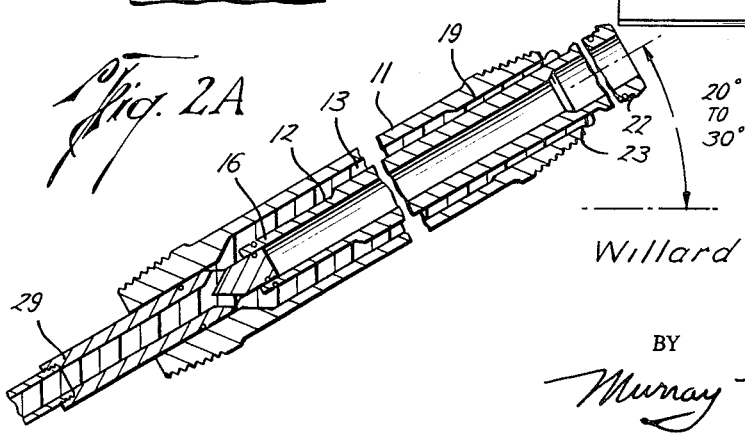
Willard B. Kimbrell
INVENTOR.
BY
Murray Robinson
ATTORNEY

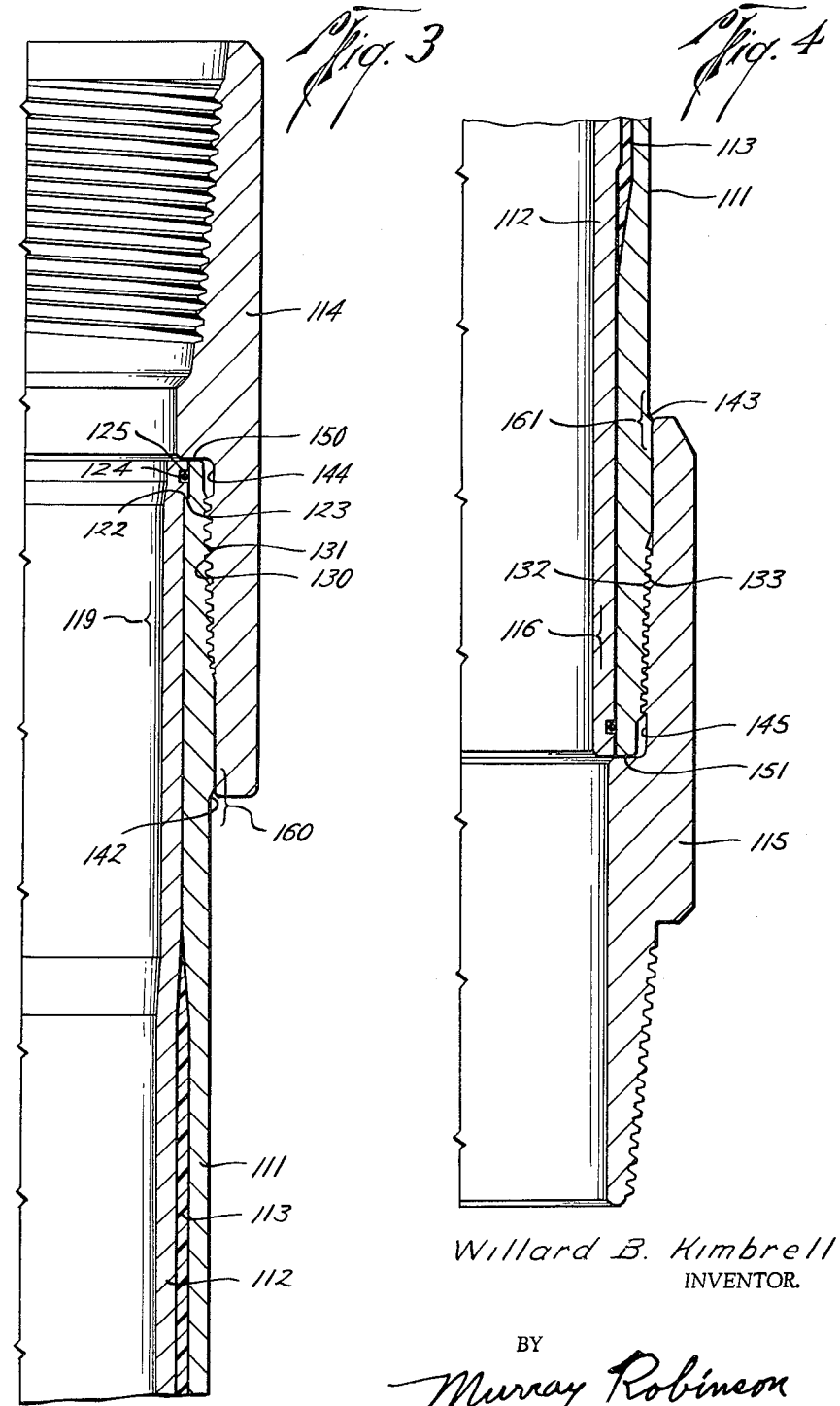

July 20, 1965  W. B. KIMBRELL  3,195,927
WEIGHT PIPE

Filed April 4, 1962  4 Sheets-Sheet 3

Willard B. Kimbrell
INVENTOR.

BY
Murray Robinson
ATTORNEY

July 20, 1965   W. B. KIMBRELL   3,195,927
WEIGHT PIPE
Filed April 4, 1962   4 Sheets-Sheet 4
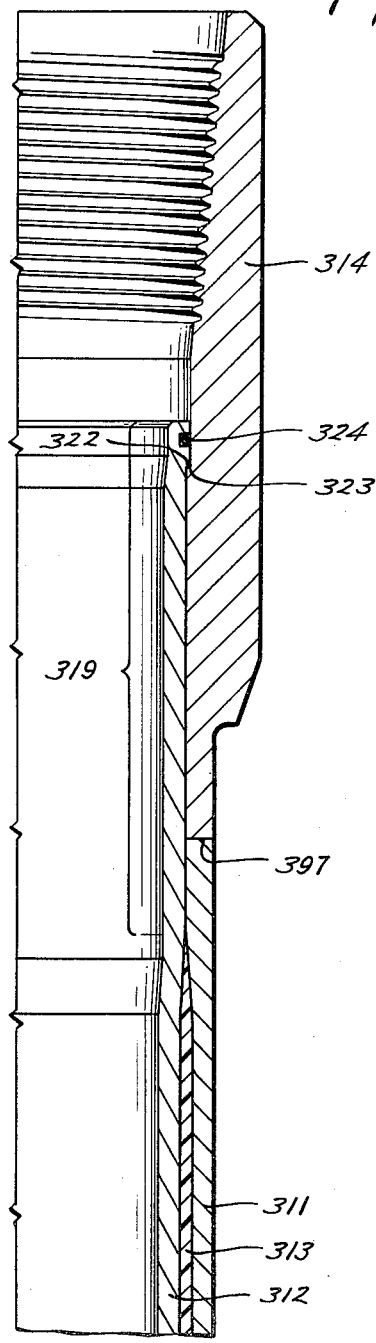
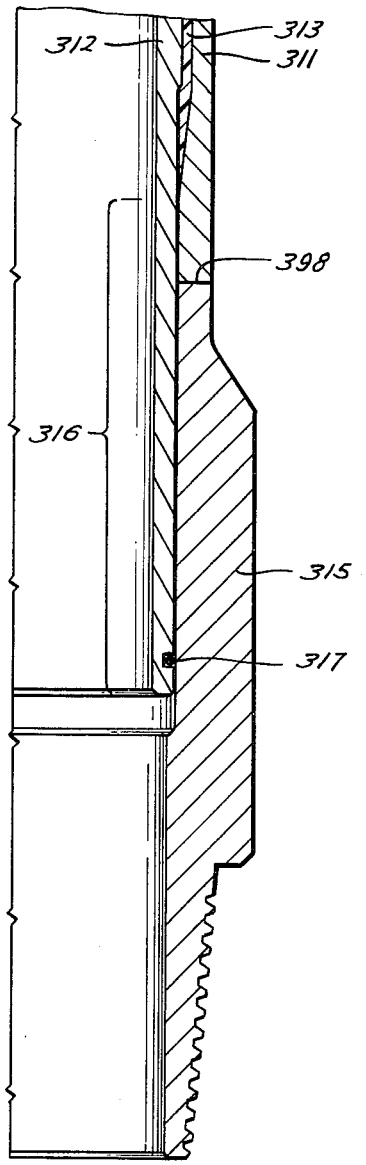
Willard B. Kimbrell
INVENTOR.
BY
Murray Robinson
ATTORNEY

3,195,927
WEIGHT PIPE

Willard B. Kimbrell, Great Bend, Kans., assignor, by mesne assignments, to Flexweight Drill Pipe Co., Inc., Great Bend, Kans., a corporation of Kansas
Filed Apr. 4, 1962, Ser. No. 185,116
6 Claims. (Cl. 285—1)

This invention pertains to drill strings and more particularly to weight pipe. Weight pipe is heavier than ordinary drill pipe, whereby through the use of weight pipe some or all of the drill collars can be eliminated. Being less rigid than drill collars, weight pipe is less apt to be a source of twistoffs and other failures.

Heretofore, as disclosed in my prior Patent Number 2,808,231, added weight without added rigidity has been accomplished in weight pipe by the use of double wall pipe with one end of one wall free whereby only the other wall contributes to rigidity, the one merely supplying weight. The annular space between the walls is filled with a fluid, preferably denser than drilling mud to further increase the weight of the pipe, and to keep water out of the annulus so as to prevent rust.

Due to the fact that one end of one pipe wall is free, difficuty was experienced with loss of fluid from the annulus. As the protective dense fluid leaked out, drilling mud took its place, causing rust. Then the sand in the mud settled out, filling the annulus, and the inner and outer walls of the pipe became locked together. The useful life of the weight pipe was therefore shortened. Difficulties were also experienced in the manufacture of the pipe due to the method of introduction of the dense fluid into the annulus, which, in an effort to achieve total filling of the annulus, was accomplished by the use of a special filling passage later to be closed by a plug. Finally the shrink fitting together of the lower ends of the tubes forming the inner and outer walls in order to connect them together so that the one can carry axial load in case of failure of the other requires the use of high temperatures deleterious to most sealing materials.

The present invention overcomes the foregoing difficulties while retaining the basic advantages of the weight pipe principle—added weight without added rigidity—and at the same time presents certain other advantages of strength in use and ease of manufacture as will appear hereinafter.

According to the invention, both ends of both the inner and outer tubular walls of the double wall pipe are rigidly fixed. However the outer wall or tube is in tension while the inner wall or tube is in compression before the weight pipe is connected in the drill string. With the weight pipe connected in the string and run near the bit below the neutral point in the drill string, there will be a compressive load applied to the pipe. This will increase the compression in the inner tube while relaxing the tension in the outer tube. Because of its compression the inner tube will be more flexible. This results from the fact that a member in compression can bend a certain amount about axes outside the member without increasing the stress therein except at the ends, this being the familiar action which causes long columns to buckle under compressive loads. Therefore by prestressing the pipe in the manner stated, the added weight is achieved without a proportionate added amount of rigidity. Since both ends of both the inner and outer walls of the pipe are rigidly fixed, it is possible to form a seal therebetween preventing egress of the weight fluid out of the annular space therebetween and preventing entrance of drilling mud and sand into the space. In fact the seal can be pressure tight so that the weight fluid may be maintained under pressure, which helps maintain the seal against entrance of the drilling mud which is itself at a high pressure at the bottom of a well. The invention may therefore be characterized rather simply as pressurized prestressed weight pipe.

For a detailed description of preferred embodiments of the invention reference will now be made to the accompanying scale drawing, wherein FIGURE 1 is an axial section through the right-hand half of a portion of the upper end of a weight pipe embodying the invention;

FIGURE 2 is an axial section through the right-hand half of a portion of the lower end of a weight pipe embodying the invention;

FIGURE 2A is a schematic view illustrating a step in the assembly of the apparatus of FIGURES 1 and 2;

Figure 5:
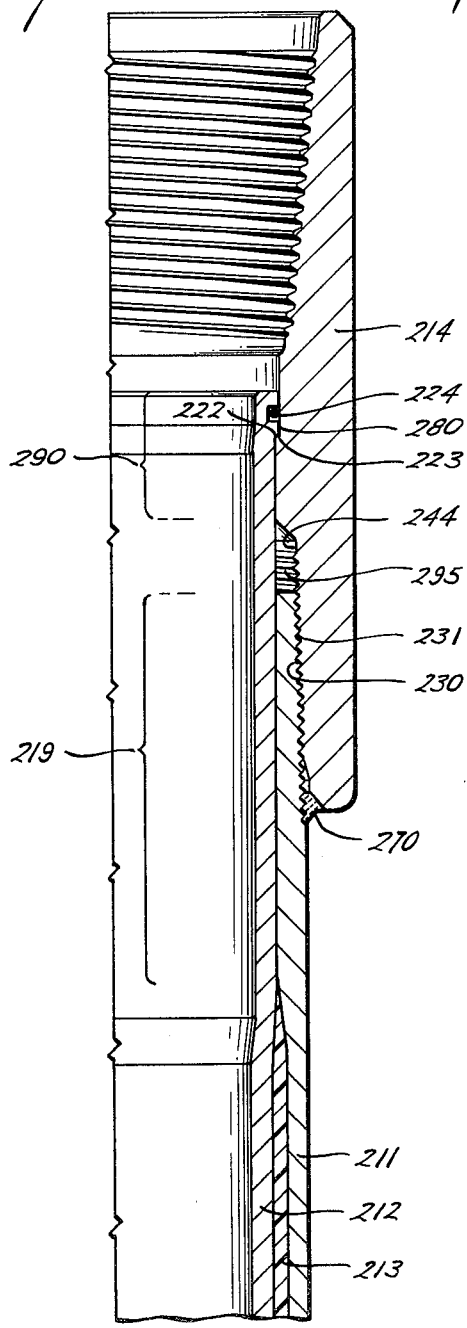

FIGURES 3 and 4, 5 and 6, and 7 and 8, are similar to views 1 and 2, showing modifications.

Referring now to FIGURES 1 and 2, there is shown a weight pipe comprising an outer tube 11 and an inner tube 12 concentrically disposed therein. The tubes are spaced apart throughout most of their lengths, leaving an annular chamber or space 13 therebetween which is filled with a fluid, preferably heavier than drilling mud, such, e.g., denser than 1.4 as a viscous tar which, as will be explained hereinafter, is at a pressure of 500 to 1500 p.s.i. The space 13, it is to be noted, is not merely a paper thin crack between two relatively slidable members but is of a radial thickness of the same order of magnitude as the wall thickness of tubes 11 and 12.

The drawing shows only a portion of the full length of the pipe, which will normally be about thirty feet. The drawing shows only half of the full diameter of the pipe which in the case illustrated has a 4½ inch O.D. measured on the outer tube. Therefore the slenderness ratio of the pipe is near but slightly above the minimum ratio, 150, for long columns as determined by Euler's formula whereby under compressive loads the pipe will fail by buckling rather than exceeding the compressive strength of the pipe.

The upper end of the pipe is provided with a tool joint box 14 and the lower end with a tool joint pin 15. Various methods may be used for attaching the tool joints to the pipe, as will be detailed hereinafter. In all cases the connection of the tool joints to the pipe is semi-permanent, it being intended that only the connections between pin and box of adjacent joints be made and broken during use of the weight pipe in a drill string. Therefore the tool joints may be considered to be a part of the weight pipe, if desired, even though they are removable and replaceable.

Referring to FIGURE 2, the lower end of inner tube 12 includes a smooth (unthreaded) cylindrical outer portion which is press fitted into a smooth cylindrical inner portion at the lower end of outer tube 11 at 16. An interference fit of 0.007 to 0.011 inch on diameters may be used. The degree of interference over the area 16 should be sufficient interference so that the load of the drill string can be transmitted from the outer tube to the inner tube and carried by the inner tube in case of failure of the outer tube. An O-ring 17 made of a non-metallic, low elastic modulus, oil-resistant, resilient material, e.g., an elastomer with a 60–90 durometer hardness, provides a high pressure seal. A suitable material is a halogen-butadiene synthetic rubber, for example Neoprene, or preferably a fluoro-elastomer sold by the Du Pont Company under the name Viton A, and may have a hardness of 90 durometer. The O-ring is disposed in an annular groove 18 formed preferably on inner member 12.

Referring now to FIGURE 1, the upper end of inner tube 12 includes a smooth cylindrical outer portion which is press fitted into a smooth cylindrical inner portion at the upper end of outer tube 11 at 19. An interference fit of 0.004 to 0.008 may be used. For reasons later to be explained, the diameter at 16 is somewhat less than at 19. Therefore the hoop tension at 19 is less for any given amount of interference than it is at 16 for the same interference, other factors being equal. The effect of this on the relative rotational resistance at 16 and 19 is added to by the fact that the length of area 16 is somewhat greater than that of area 19. The degree of interference over the area 19, taken together with the area thereof, should be such that in the event outer tube 11 parts due to over-torque the tubes will rotationally slip relative to each other at 19 under a lower torque than that needed to cause rotational slippage at 16, whereby the connection at 16 will not be caused to slip. All other factors being equal this would necessitate the degree of interference at 16 being greater than that at 19, and if the chosen interference fit at 19 is at the high end of the range given, the fit at 16 should be chosen at the higher end of the range. Inner tube 12 is provided with a surface 22 having at least a component facing downwardly, and surface 22 overlies a surface 23 on the outer tube, which surface 23 has at least a component facing upwardly. In the event of a twist off of outer tube 11 and slippage at 19, surfaces 22 and 23 will provide abutment means to transmit axial tension from the inner tube to the outer tube at the upper ends thereof. With the connection at 16 still intact, the entire drill string including that below the parted weight pipe as well as that above can be lifted and withdrawn. Expensive fishing operations are thus avoided.

Although the connection at 19 is intended to slip under lower torque than that at 16, nevertheless the connection is normally a rigid non-moving connection. An O-ring 24, made of a material similar to that of O-ring 17, provides a high pressure seal. O-ring 24 is disposed in an annular groove 25, preferably on the outside of pipe 11.

Referring now to FIGURE 2A, the inner tube and outer tube are assembled by telescoping the inner tube into the outer tube through the end thereof adjacent surface 23, the press fit area on the outer tube at 19 being of sufficient diameter to pass small diameter press fit area of the inner tube at 16.

Before the press fit areas actually engage, that is while there are still gaps therebetween a straddle packer 29 is placed over the gap at the end of the pipe opposite from surfaces 22, 23, that is, the lower or pin end as the pipe appears when in use. The pipe is inclined at an angle to the horizontal, for example twenty to thirty degrees, with the box end up. Weight fluid, such as a bituminous tar with dense fillers, is then pumped into space 13 through the straddle packer and lower gap while air leaves space 13 through the upper gap. When the space 13 is full of tar, the inner pipe is telescoped into the outer pipe farther sufficient to bring both press fit areas 16 and 19 into partial engagement, trapping the tar in space 13. The straddle packer is then removed and the inner pipe further telescoped into the outer pipe to fully engage the press fit areas 16 and 19. Since the outer diameter of inner tube 11 at area 19 is greater than its outer diameter at 16, when the inner member and outer member are telescoped together, the volume of the annular space 13 therebetween decreases. This places the tar or other high density fluid therebetween under high pressure.

During assembly, the outer tube will be held stationary at its upper end while the inner tube is pushed into place through the upper end of the outer tube. As soon as the tubes begin to engage at 16, the outer tube will be in tension and the inner tube in compression; this prestressed condition will be maintained after the assembly is completed. If the tubes slip at either 16 or 19 after assembly the pipe should be disassembled and reworked so as to produce the necessary interference fit. A mere transition fit is insufficient. For a further definition of fits reference may be made to Machinery Handbook, Fifteenth Edition, 1956, Third Printing at page 1057.

Since the interference fit at 16 must produce a connection tight enough to lift the weight of all of the drill string therebelow in case of a twist off of outer tube 11, it is apparent that a force considerably in excess of such weight will be required to assemble the inner and outer tubes. The resulting compressive stress in the inner tube may thus be of the order of 1000 to 20,000 p.s.i. depending on the size of pipe and intended use. There will be a tension in the outer tube 12 sufficient to balance the compression of the inner tube.

After the tubes 11 and 12 have been assembled with the space 13 therebetween filled with tar or other heavy fluid, tool joints 14 and 15 may be connected thereto. The connections shown are shrink fitted taper threaded connections with conical stabilizing and sealing lands. The threads are shown at 30, 31 on the upper end of the pipe and at 32, 33 on the lower end. Axial clearance is provided between the thread flanks on the outer tube and those on the tool joint to allow make up when at different temperatures. The lands are shown at 34, 35, 36, 37 and 38, 39, 40, 41. They are on a cone passing through the base of the threads on the outer tube. Lands 34 and 38 join the outer periphery of tube 11 at stress relief fillets 42, 43.

It is to be noted that the ends of the tubes 11, 12 do not bottom in the sockets 44, 45 of the tool joints. Therefore there are no axial stresses produced adjacent the lands 36, 37, 40, 41 opposite seals 17 and 24 by the shrink fitting thereon of the hot tool joints. Since only the tool joints are heated, e.g., to 750 deg. F. the seals 17 and 24 will be subjected to only such temperatures as may be produced by heat transfer thereto during the application and cooling of the joints. The fluor-elastomer material can withstand such temperatures without damage. Therefore the seals 17 and 24 will not be disturbed by the application of the tool joints.

The construction shown in FIGURES 3 and 4 is substantially the same as that shown in FIGURES 1 and 2. Corresponding parts are therefore given the same numbers plus 100. In this construction the ends of the tubes 111, 112, bottom in the sockets of the tool joints 114, 115. The shrink fitting of the joints produces seals between the bottoms of sockets 144, 145 and the ends of the tubes. These take the place of the seals at lands 36, 37, 40, 41 of the construction of FIGURES 1 and 2. It will be noted that the ends of both inner and outer tubes 111, 112 contact the socket bottoms 150, 151 so that axial stress produced during shrinking of the tool joints strains both tubes equally and consequently there is no relative motion produced at either of the press fitted areas 116, 119 that might disturb the seal.

Since the ends of both tubes 111, 112 must contact socket bottom 150, the upwardly facing surface 123 on tube 111, to which axial load is transmitted in case of a twist off of tube 111, is provided by a shoulder on the interior of tube 111 rather than by the end of the tube as in FIGURE 1. Also, the surfaces 122, 123 are located below seal 124 and seal groove 125 opposite the threaded portions 130, 131 where there is more radial support, as is desirable because of the restricted radial extent of surfaces 122, 123.

The areas 160, 161 on the surface of outer tube 111 are stress relieved and cold rolled prior to connection of the tool joints on the outer tube and preferably prior to insertion of inner tube 112 into the outer tube. This procedure places the surface fibres of the metal in axial tension so that bending at this area does not produce any compression of the fibres, merely relaxation of the tension on one side and increase thereof on the other, thus eliminating stress reversals and reducing fatigue failure at this point.

Figure 6:
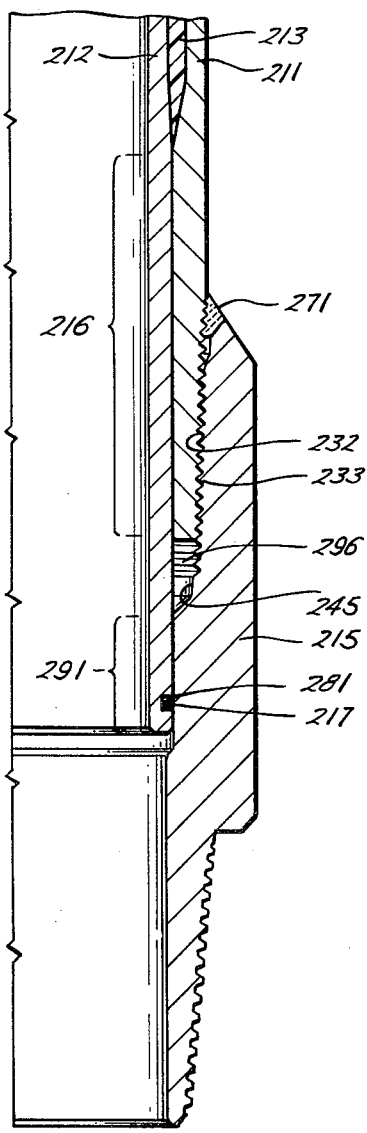

In the embodiment of FIGURES 5 and 6, which is basically the same as in the previously described embodiments, like parts are given the same numbers as in FIGURES 1 and 2 plus 200. In this embodiment the tool joints 214, 215 are connected to the outer tube 211 before the inner tube 212 is pressed therein because the tool joints are welded at 270, 271 to the outer tube after being screwed thereon by means of threads 230, 231, 232, 233. The welding operation produces sufficient heat and distortion to make it undesirable to press tube 212 into tube 211 until after the weld has been completed. No shrink fit is used in connecting the tool joints since the welds prevent the connections from unscrewing. No lands are used nor do the ends of the tubes bottom in the sockets, for the welds provide all the sealing that is necessary.

Since the tool joints are welded to the outer tube 211 before tube 211 is pressed therein, it becomes possible to use the tool joints themselves to seal with the inner tube. The seals 217 and 224 thus engage with the bores 280, 281 of the tool joints at areas well removed from the welds 270, 271 and hence at areas that will be free of distortion so that most satisfactory sealing can be achieved. The bores 280, 281, it will be noted, are of larger diameter than the corresponding sections of the tool joints of the FIGURES 1–4 constructions, whereby there is room to pass the inner tube 212 into position after the tool joints have been connected to the outer tube.

The surface 222 for transmitting axial load from the inner tube, in event of twist off of the outer tube, engages surface 223 which is on the tool joint instead of the outer tube 212. It is especially true in this embodiment that the tool joints and outer tube in effect form a single outer member comparable with the outer tube alone of the previously described embodiments, so that the surface 223 can as well be on the tool joint as on the outer tube. It is desirable to put surface 223 on the tool joint to avoid the alternative of extending bore 280 all the way through the tool joints as would otherwise be required to pass the large diameter end of inner tube 212 carrying surface 222.

The press interference fits areas 219 are provided between the inner tube and outer tube at the ends thereof the same as in the previously described embodiments. However additional press fit areas 290, 291 are provided between the inner tube 212 and the tool joint bores 280, 281. The distance from the top of area 216 to the bottom of area 291 on the inner tube is less than the distance from the top of area 290 to the bottom of area 219 on the inner tube.

It is to be noted that although the weight fluid is inserted in the weight pipe before the tool joints are added thereto in the FIGURES 1–2 embodiment (and the FIGURES 3–4 embodiment is assembled and filled the same as the FIGURES 1–2 embodiment), in the FIGURES 5–6 embodiment (and the FIGURES 7–8 embodiment is handled the same way) the tool joints are added to the outer tubes before the weight fluid is pumped into the pipe. But except for this the manner of filling with weight fluid is the same in all embodiments. The space 295 between tool joint 214 and inner member 212 will be filled with tar during filling of annulus 213, and the space 296 between tool joint 215 and inner member 212 will also fill up with tar at this time. The tar in these areas is also placed under pressure as the inner member is pressed into its final position. The seals 217 and 224 however prevent any ultimate loss of the tar.

The press fit assembly of the FIGURES 5 and 6 construction will place the inner tube in compression as in the previously described embodiments and the outer tube and adjacent parts of the tool joints will be in tension.

Referring now to FIGURES 7 and 8, the construction is similar to that of the previously described embodiments and like parts will be given the same numbers as in FIGURES 1 and 2 plus 300. The construction of FIGURES 7 and 8 is most similar to that of FIGURES 5 and 6, and differs therefrom primarily in that instead of connecting the tool joints 314, 315 to the outer pipe 311 by a combination of threading and welding, the tool joints are integrally connected to the outer tube by flash welding at 397, 398. The press fit areas 316, 319 are continuous areas uninterrupted by any joint spaces such as 295, 296 of the embodiment of FIGURES 5 and 6. The seals 317, 325 maintain the pressure of the tar or other heavy fluid in the annulus 313. The tool joints 314, 315, as in the other embodiments also, but particularly in this embodiment, will be made of high grade alloy steel of a better material than the inner and outer tubes 311, 312, so that they may last as long as the tubes. The surfaces 322, 323 are provided to transmit axial tension in case of failure of the outer tube, the same as in the previously described embodiments.

Comparing the embodiments of the invention of FIGURES 1–4 with those of FIGURES 5–8, it will be seen that in both cases there is provided an inner tube within an outer member, the tube and member being prestressed, and tool joints are provided at each end of the weight pipe. In the embodiments of FIGURES 1–4, the outer member includes only an outer tube and the tool joints are connected to the outer tube in such a way as to be removable without affecting the prestress of the inner tube and outer member. In the embodiments of FIGURES 5–8, the outer member includes not only the outer tube but also the tool joints which are welded thereto. The term outer member will be used broadly hereinafter to encompass both arrangements.

While preferred embodiments of the invention have been shown and described, many modifications thereof can be made by one skilled in the art, without departing from the spirit of the invention and it is intended to cover by Letters Patent all forms of the invention falling within the scope of the following claims.

I claim:

1. A weight pipe comprising
an outer member prestressed in axial tension and having an upper end and a lower end,
an inner tube prestressed in axial compression disposed in said outer member and having an upper end and a lower end,
the upper end of said inner tube being press fitted with an interference fit within the upper end of said outer member forming an overload releasable joint between said upper ends,
the lower end of said inner tube being press fitted within the lower end of said outer member forming a joint between said lower ends but the press fit joint between the upper ends of said inner tube and outer member requiring less overload torque to cause relative motion therebetween than would be required to cause relative motion at the joint between the lower ends of said inner tube and outer member whereby the joint at said lower ends is stronger with respect to torque resistance than the press fit joint between the upper ends of said inner tube and outer member,
the outer diameter of the upper end of the inner tube at the joint with the upper end of the outer member being larger than the diameter of the lower end of the inner tube at the joint with the lower end of the outer member,
means cooperatively disposed between the inner tube and outer member adjacent the upper ends thereof to transmit axial tension from the inner tube to the outer member when said overload releasable joint has released but allowing rotation of said upper end of the outer member relative to said inner tube when said overload releasable joint has released,
said inner tube being separated from said outer member between said joints forming an annular chamber extending from the joint between said upper ends to the joint between said lower ends,
both of said joints being rendered fluid tight, and
a fluid having a density greater than 1.4 filling said chamber,
said joints being constructed and arranged to maintain said tension and compression so long as said overload releasable joint is not released.

2. Combination according to claim 1 wherein said pipe has a slenderness ratio in excess of 150, the spacing of said tube and member throughout most of said chamber is a radial distance of the same order of magnitude as the thicknesses of the inner tube and outer member, and the chamber is devoid of rigid material bridging between the inner tube and outer member.

3. Combination according to claim 1 wherein each said joint in addition to the aforementioned press fit thereat includes a pressure seal means, said fluid filling said annular chamber is a liquid under pressure; and the inner tube and outer member forming said annular chamber are impervious to the entrance of pressure fluid external to said chamber.

4. Combination according to claim 1, wherein said outer member includes an outer tube with a tool joint welded to the upper end thereof, said tool joint having a smooth cylindrical inner portion, said upper end of said inner tube including a smooth cylindrical portion, said press fit joint at said upper ends comprising said smooth cylindrical inner portion press fitted within said smooth cylindrical outer portion, said means to transmit axial tension comprising a downwardly facing plane annular shoulder near the upper end of said inner tube and an upwardly facing plane annular shoulder near the upper end of said outer member and disposed under said downwardly facing shoulder, said downwardly facing member being formed in said tool joint.

5. Combination according to claim 1 wherein said outer member includes an outer tube and a tool joint shrink fitted onto the lower end of the outer tube, the lower end of said outer tube includes a smooth cylindrical inner portion and the lower end of said inner tube includes a smooth cylindrical outer portion, said press fit joint at the lower ends of said inner tube and outer member comprising said smooth cylindrical outer portion press fitted within said smooth cylindrical inner portion, said joints being rendered fluid tight by pressure seal means at each of said joints, the pressure seal means at said joint at the lower ends of said inner tube and outer member comprising a seal ring resistant to high temperature as is a fluor-elastomer disposed in a groove between said smooth cylindrical portions.

6. A weight pipe comprising an outer member prestressed in axial tension and having
an upper end and
a lower end,
an inner tube prestressed in axial compression disposed in said outer member and having
an upper end and
a lower end,
the upper end of said inner tube being press fitted within the upper end of said outer member forming
a rigid joint between said upper ends,
the lower end of said inner tube being press fitted within the lower end of said outer member forming
a rigid joint between said lower ends,
said joints being made with an interference fit to maintain said tension and compression,
abutment means to transmit axial tension from the inner tube to the outer member at the upper end thereof,
the press fit joint between the upper ends of said inner tube and outer member including a portion below said abutment means,
the press fit joint between the upper ends of said inner tube and outer member having a less amount of interference than that at the lower ends of said inner tube and outer member whereby the joint at said lower ends is stronger with respect to torque resistance than the press fit joint between the upper ends of said inner tube and outer member, said inner tube being separated from said outer member between said joints forming
an annular chamber extending from the joint between said upper ends to the joint between said lower ends,
a fluid denser than drilling mud filling said chamber under pressure,
pressure seal means between said upper ends,
pressure seal means between said lower ends,
said pressure seal means each being nearer the adjacent extremity of said inner tube than a portion of the press fit joint adjacent that extremity,
the outer diameter of the upper end of the inner tube at the joint with the upper end of the outer member being larger than the diameter of the lower end of the inner tube at the joint with the lower end of the outer member.

References Cited by the Examiner
UNITED STATES PATENTS

| | | | |
|---|---|---|---|
| 998,076 | 7/11 | Daniels | 285—355 X |
| 1,010,098 | 11/11 | Waitz | 285—355 |
| 1,953,172 | 4/34 | Griffiths | 285—55 |
| 2,073,093 | 3/37 | Brantly | 285—333 |
| 2,082,379 | 6/37 | Brittain | 29—525 |
| 2,259,191 | 10/41 | Allen | 285—55 |
| 2,267,339 | 12/41 | Paulsen | 29—447 |
| 2,412,271 | 12/46 | Kercher | 29—447 |
| 2,453,079 | 11/48 | Rossmann | 50—128 X |
| 2,593,729 | 4/52 | Coberly. | |
| 2,610,028 | 9/52 | Smith | 285—55 X |
| 2,641,488 | 6/53 | Dunn. | |
| 2,788,994 | 4/57 | Van De Wateren | 285—382 |
| 2,808,231 | 10/57 | Kimbrell | 285—55 |
| 2,814,462 | 11/57 | De Jarnett | 285—138 |
| 2,825,585 | 3/58 | Griffin | 285—333 |
| 2,927,806 | 3/60 | Lahee | 285—333 X |
| 3,047,313 | 7/62 | Bruce | 285—333 |
| 3,080,179 | 3/63 | Huntsinger | 285—114 |

CARL W. TOMLIN, *Primary Examiner.*